United States Patent
Geringer et al.

(10) Patent No.: US 6,899,488 B2
(45) Date of Patent: May 31, 2005

(54) SYSTEM FOR MOUNTING FLANGED PART TO HARDENED PLATE

(75) Inventors: Bernhard Geringer, Pischelsdorf (AT); Hubert Höfer, Baden (AT)

(73) Assignee: Steyr-Daimler-Puch Spezialfahrzeug AG & Co. KG, Vienna (AT)

( * ) Notice: Subject to any disclaimer, the term of this patent is extended or adjusted under 35 U.S.C. 154(b) by 0 days.

(21) Appl. No.: 10/436,817

(22) Filed: May 13, 2003

(65) Prior Publication Data

US 2003/0235465 A1 Dec. 25, 2003

(30) Foreign Application Priority Data

May 17, 2002 (AT) ..................................... GM314/2002

(51) Int. Cl.⁷ ............................................... F16L 23/00
(52) U.S. Cl. ....................... 403/337; 403/335; 403/262; 403/408.1; 403/270; 403/271; 296/30
(58) Field of Search ................................ 403/187, 230, 403/238, 262, 270–272, 335–337, 408.1; 296/29, 30; 105/394, 401, 409; 114/356; 109/49.5, 80, 85

(56) References Cited

U.S. PATENT DOCUMENTS

| | | | | |
|---|---|---|---|---|
| 2,790,656 A | * | 4/1957 | Cook | 403/270 |
| 3,305,995 A | * | 2/1967 | Armstrong et al. | 52/512 |
| 4,437,784 A | * | 3/1984 | Peterson | 403/408.1 |
| 4,913,472 A | * | 4/1990 | Janakirama-Rao | 285/336 |
| 5,289,733 A | * | 3/1994 | Kallenberger | 74/447 |

\* cited by examiner

Primary Examiner—Daniel P. Stodola
Assistant Examiner—Michael P. Ferguson
(74) Attorney, Agent, or Firm—Herbert Dubno; Andrew Wilford

(57) ABSTRACT

A fastening system has a mounting plate of substantially greater area than a flange of a part being attached to a hardened plate. This mounting plate is sandwiched between the flange and an outer face of the hardened plate and has an outer periphery spaced well outward of the flange. A plurality of nuts bear on an inner face of the hardened plate in line with the flange. Respective bolts extend through the flange, mounting plate, and hardened plate into the nuts and press the flange and mounting plate against the outer face of the hardened plate. A weld at the outer periphery secures the mounting plate to the hardened plate.

3 Claims, 2 Drawing Sheets

SYSTEM FOR MOUNTING FLANGED PART TO HARDENED PLATE

FIELD OF THE INVENTION

The present invention relates to a system for securing a flanged part to a hardened plate. More particularly this invention concerns the mounting of a flanged part on a wall of an armored vehicle or the like.

BACKGROUND OF THE INVENTION

Modern-day armor plate made of specially alloyed and hardened steel is used in military and civilian armored vehicles. While having considerable ballistic resistance and a high armor rating, such plating is still relatively light.

The disadvantage of this material in that it is very difficult to machine and is quite brittle. What is more it has little bending resistance and can develop cracks readily when drilled, welded, or cut.

Thus in order to secure a part, for instance a track idler wheel, to such armor plating, it is standard to provide the part with a flange that is both bolted and welded in place. Bolts pass completely through the flange and armor plate and are secured in nuts welded to the inside surface of the armor plate. In addition the flange itself is welded to the outer surface of the plate.

Such construction has the considerable disadvantage that the welding of the bolts and of the flange produces internal stresses and even tiny cracks in the region where the part is actually supported on the hardened plate. The location of these cracks just where the bending stress is greatest from the attachment can lead to complete joint failure. Repairing such damage is extremely difficult and time-consuming.

OBJECTS OF THE INVENTION

It is therefore an object of the present invention to provide an improved system for securing a flanged part to a hardened plate.

Another object is the provision of such an improved system for securing a flanged part to a hardened plate which overcomes the above-given disadvantages, that in which provides a strong connection without damaging or weakening the hardened plate at the joint.

SUMMARY OF THE INVENTION

These objects are achieved in a fastening system that has according to the invention a mounting plate of substantially greater area than the flange of the part being attached to the hardened plate. This mounting plate is sandwiched between the flange and an outer face of the hardened plate and has an outer periphery spaced well outward of the flange. A plurality of nuts bear on an inner face of the hardened plate in line with the flange. Respective bolts extend through the flange, mounting plate, and hardened plate into the nuts and press the flange and mounting plate against the outer face of the hardened plate. A weld at the outer periphery secures the mounting plate to the hardened plate.

Thus with this system any stresses created by welding are well spaced from the critical location where the part is joined to the hardened plate. In addition the nuts are not welded to the hardened plate at all. Thus the cracks and stresses induced in the prior-art systems by attaching the nuts in place is also avoided.

More particularly a thin positioning plate bears on the inner face of the hardened plate. The nuts are attached to the positioning plate. In fact the sole function of this positioning plate is to orient the nuts before the flange is bolted to them; in the completed assembly it serves no significant function.

The hardened plate according to the invention is a wall of an armored vehicle, or of a piece of heavy-duty construction equipment.

BRIEF DESCRIPTION OF THE DRAWINGS

The above and other objects, features, and advantages will become more readily apparent from the following description, reference being made to the accompanying drawing in which.

SPECIFIC DESCRIPTION

Figure 1:
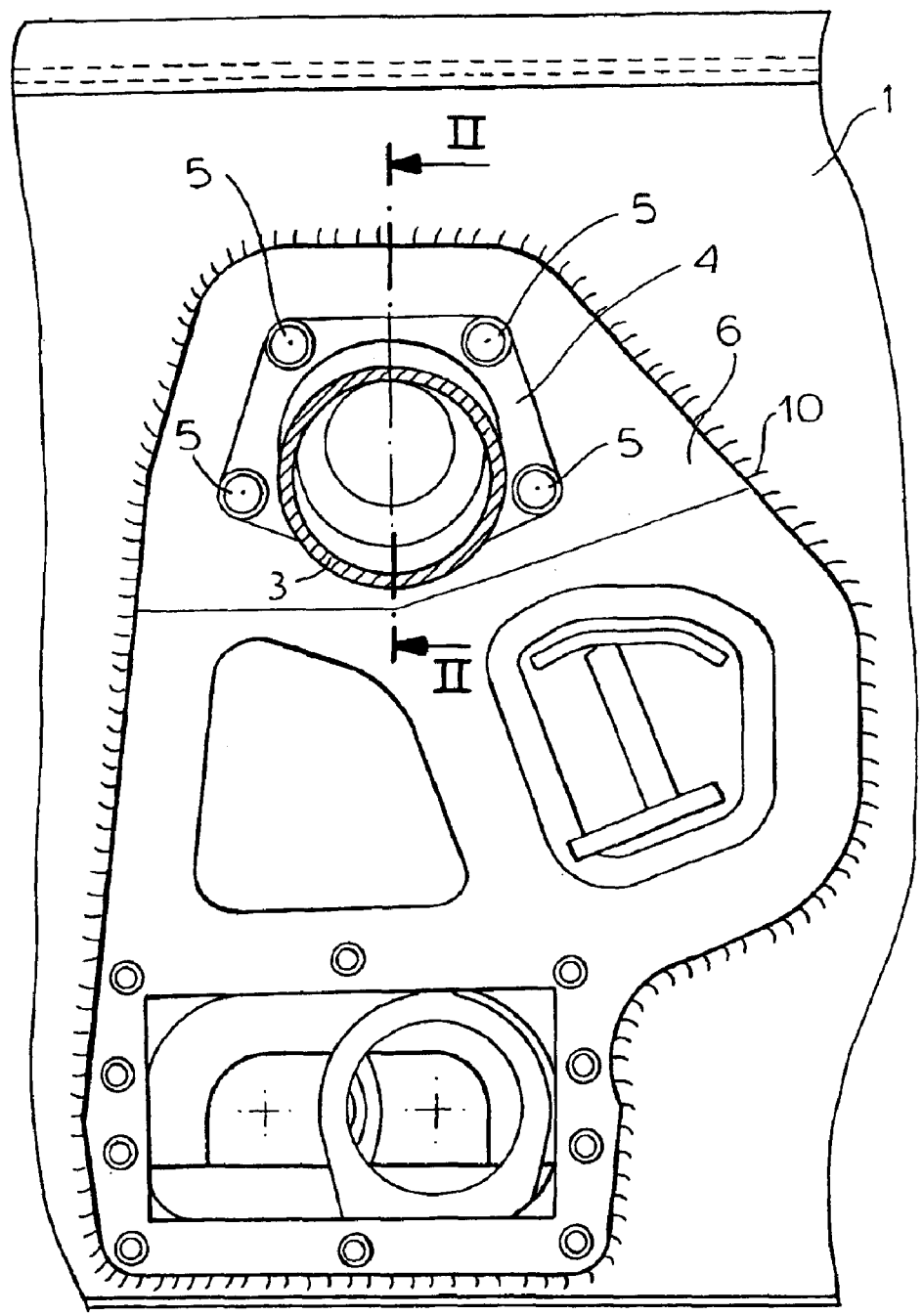
FIG. 1 is a vertical section taken along line I—I of FIG. 2.
Figures 2, 3:
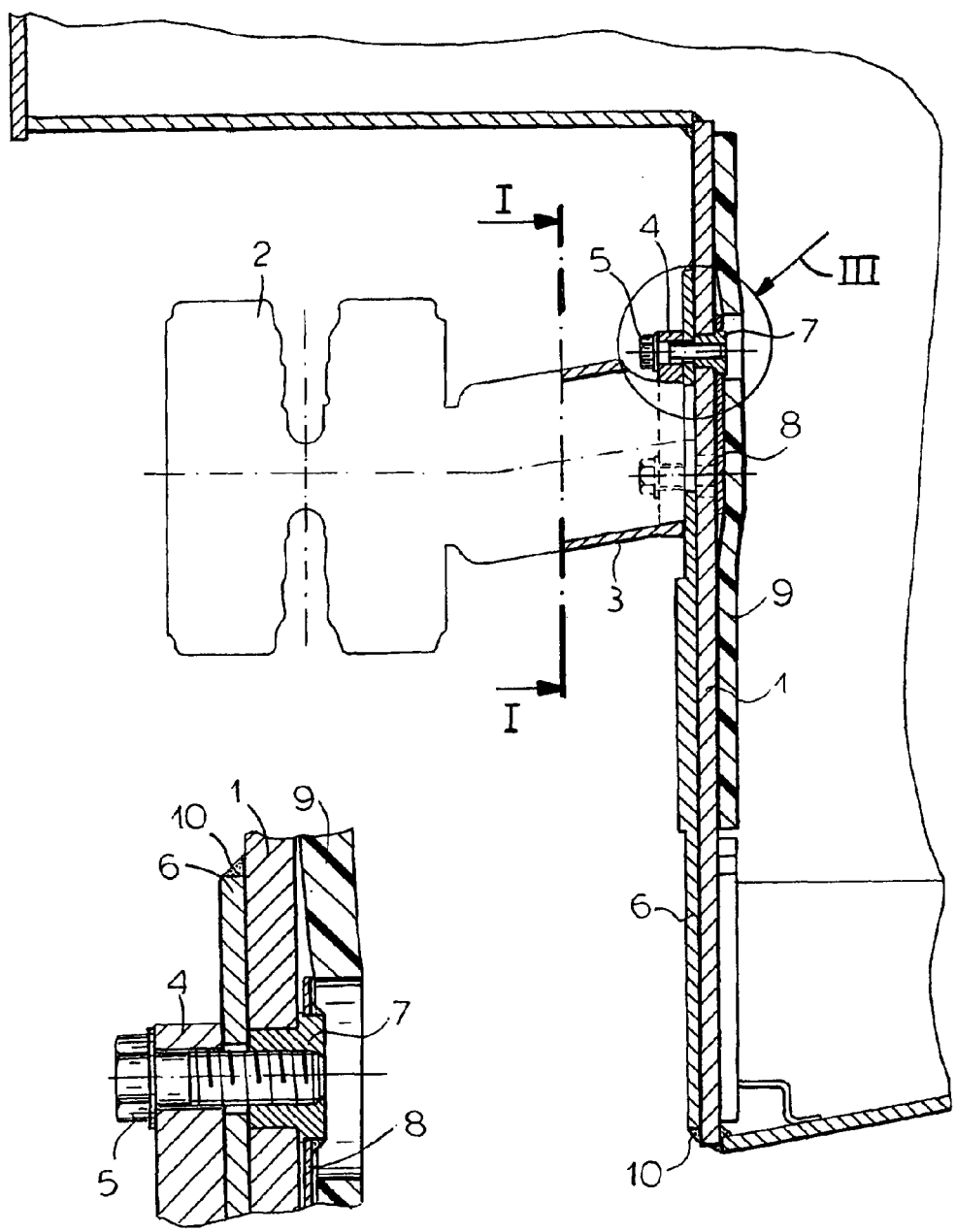
FIG. 2 is a vertical section taken along line II—II of FIG. 1.
FIG. 3 is a large-scale view of the detail indicated at III in FIG. 2.

As seen in the drawing, a hardened steel plate 1 forming a vertical side wall of an armored vehicle is connected to a tubular steel part 3 carrying idler wheels 2 intended to support the upper stretch of a track. The part 3 is not made of armored steel and has a generally planar flange 4. Bolts 5 extend through the flange 4, with bolt heads bearing on an outer face of the flange 4 and bolt shanks threaded into T-nuts 7 bearing on an inner face of the plate 1.

According to the invention an unhardened steel mounting plate 6 is sandwiched between the flange 4 and the outside face of the plate 1 and is drilled out for the bolts 5. This mounting plate 6 is of substantially greater area than the flange 4 so that its outer edge is spaced considerably outward from the outer edge of the flange 4, where it is secured to the outer face of the plate 1 by a fillet weld 10.

The nuts 7 are secured by tack welds to a thin steel plate 8 that bears against the inner face of the plate 1 and that serves purely for positioning the nuts 7. On the inside of this plate 8 there is a spall-liner 9.

Thus with the system of this invention there are no welds on the hardened plate 1 near where the flange 4 is attached. Instead the only weld is the weld 10 around the outer periphery of the mounting plate 6, spaced well away from the region of the plate 1 most heavily loaded by the part 3. Welds provided between the nuts 7 and the thin positioning plate 8 will not affect the plate 1.

We claim:

1. In combination with a hardened metal plate and a part having generally planar flange, a fastening system comprising:

a generally planar mounting plate of substantially greater surface area than the flange and substantially smaller surface area than the hardened plate, sandwiched between the flange and an outer face of the hardened plate, and having an outer periphery spaced well outward of the flange;

a plurality of nuts bearing on an inner face of the hardened plate in line with the flange and inward of the outer periphery;

respective bolts extending through the flange, mounting plate, and hardened plate into the nuts and pressing the flange and mounting plate against the outer face of the hardened plate and the nuts against the inner face of the hardened plate; and a weld at the outer periphery securing the mounting plate to the outer face of the hardened plate.

2. The fastening system defined in claim 1, further comprising a thin positioning plate bearing on the inner face of the hardened plate, the nuts being attached to the positioning plate.

3. The fastening system defined in claim 1 wherein the hardened plate is a wall of an armored vehicle.

* * * * *